US010277082B2

(12) United States Patent
Murayama (10) Patent No.: US 10,277,082 B2
(45) Date of Patent: Apr. 30, 2019

(54) POWER-TRANSMITTING DEVICE AND WIRELESS POWER-SUPPLYING SYSTEM

(71) Applicant: IHI CORPORATION, Tokyo (JP)

(72) Inventor: Takahiko Murayama, Tokyo (JP)

(73) Assignee: IHI Corporation, Tokyo (JP)

( * ) Notice: Subject to any disclaimer, the term of this patent is extended or adjusted under 35 U.S.C. 154(b) by 242 days.

(21) Appl. No.: 15/263,516

(22) Filed: Sep. 13, 2016

(65) Prior Publication Data
US 2016/0380485 A1    Dec. 29, 2016

Related U.S. Application Data

(63) Continuation of application No. PCT/JP2015/061558, filed on Apr. 15, 2015.

(30) Foreign Application Priority Data

May 30, 2014 (JP) .................. 2014-113451

(51) Int. Cl.
| H02J 50/12 | (2016.01) |
| H02J 50/80 | (2016.01) |
| H02J 50/90 | (2016.01) |
| H02J 7/02 | (2016.01) |
| H02M 1/42 | (2007.01) |
| H02M 3/337 | (2006.01) |
| H02M 1/32 | (2007.01) |

(52) U.S. Cl.
CPC .............. H02J 50/80 (2016.02); H02J 7/025 (2013.01); H02J 50/12 (2016.02); H02M 1/32 (2013.01); H02M 1/4225 (2013.01); H02M 3/3378 (2013.01); Y02B 70/126 (2013.01)

(58) Field of Classification Search
USPC .......................................... 307/104
See application file for complete search history.

(56) References Cited

U.S. PATENT DOCUMENTS

| 6,637,664 B1 | 10/2003 | Yoshigi et al. |
| 6,955,300 B1 | 10/2005 | Yoshigi et al. |
| 9,570,920 B2 | 2/2017 | Haseno et al. |
| 2013/0033228 A1 | 2/2013 | Raedy |
| 2013/0058379 A1* | 3/2013 | Kim ............... H04B 5/0031 375/146 |
| 2013/0234527 A1 | 9/2013 | Ishihara et al. |

(Continued)

FOREIGN PATENT DOCUMENTS

| CN | 102638080 A | 8/2012 |
| EP | 2637316 A1 | 9/2013 |

(Continued)

*Primary Examiner* — Rexford Barnie
*Assistant Examiner* — Xuan Ly
(74) *Attorney, Agent, or Firm* — Volpe and Koenig, P.C.

(57) ABSTRACT

When a voltage across an element of a voltage converter or an inverter circuit has reached an upper limit of a withstanding voltage of the element and it is determined that received power of a power-receiving device has not reached a target value, an instruction for changing at least one of inductance and capacitance of an element which is disposed from a receiving-side pad to a filter circuit in the power-receiving device is transmitted from a power-transmitting device to the power-receiving device so as to satisfy a condition that the received power approaches a target value.

11 Claims, 6 Drawing Sheets

(56) References Cited

U.S. PATENT DOCUMENTS

| | | |
|---|---|---|
| 2013/0257370 A1 | 10/2013 | Ichikawa |
| 2014/0339912 A1* | 11/2014 | Haseno ................ H02J 7/0042 |
| | | 307/104 |
| 2015/0028691 A1 | 1/2015 | Yamauchi et al. |
| 2015/0222198 A1* | 8/2015 | Dourbal ................ H02M 7/06 |
| | | 363/126 |
| 2017/0070047 A1* | 3/2017 | Shen ........................ H02J 3/36 |
| 2017/0133883 A1 | 5/2017 | Haseno et al. |

FOREIGN PATENT DOCUMENTS

| | | |
|---|---|---|
| EP | 2658084 A1 | 10/2013 |
| FR | 2997806 A1 | 5/2014 |
| JP | 2010-252446 A | 11/2010 |
| JP | 2011-244530 A | 12/2011 |
| JP | 2012-039707 A | 2/2012 |
| JP | 2013-187958 A | 9/2013 |
| JP | 2013-192326 A | 9/2013 |
| JP | 2014-060864 A | 4/2014 |
| WO | 01/01339 A1 | 1/2001 |
| WO | 2012/086051 A1 | 6/2012 |
| WO | 2013058178 A1 | 4/2013 |

\* cited by examiner

| INDUCTANCE | IMPEDANCE |
|---|---|
| X1 | Y1 |
| X2 | Y2 |
| X3 | Y3 |
| ⋮ | ⋮ |
| Xn | Yn |

POWER-TRANSMITTING DEVICE AND WIRELESS POWER-SUPPLYING SYSTEM

This application is a continuation application based on a PCT Patent Application No. PCT/JP2015/061558, filed on Apr. 15, 2015, whose priority is claimed on Japanese Patent Application No. 2014-113451, filed on May 30, 2014. The contents of both the PCT application and the Japanese Patent Application are incorporated herein by reference

TECHNICAL FIELD

The present disclosure relates to a power-transmitting device and a wireless power-supplying system.

DESCRIPTION OF RELATED ART

Recently, a wireless power-supplying system that supplies power from a power-transmitting device including a power-transmitting coil to a power-receiving device including a power-receiving coil using magnetism has been proposed. The power-transmitting device includes, for example, a rectifier circuit that rectifies AC power from an AC power source, a chopper circuit that converts a voltage input from the rectifier circuit and corrects a power factor, an inverter circuit that converts power input from the chopper circuit into AC power, and a power-transmitting coil that supplies power input from the inverter circuit to the power-receiving device. The power-receiving device includes a power-receiving coil that receives power from the power-transmitting device, a rectifier circuit that rectifies AC power input from the power-receiving coil, and a filter circuit that removes noise from the power input from the rectifier circuit and smoothes the input. Patent Document 1 discloses the above-described wireless power-supply system.

DOCUMENT OF RELATED ART

Patent Document

[Patent Document 1]
  Japanese Unexamined Patent Application, First Publication No. 2010-252446

SUMMARY

Technical Problem

In the related art, when a misalignment of the power-transmitting coil and the power-receiving coil occurs at the time of power supplying, desired power to be supplied to the power-receiving device is obtained by stepping up a voltage using the chopper circuit of the power-transmitting device, but the voltage should be stepped up within a withstanding voltage of a capacitor, which is disposed at an output end of a voltage converter such as the chopper circuit, of a switching element (for example, an insulated gate bipolar transistor (IGBT)) of the inverter circuit, or the like. Accordingly, when the misalignment of the power-transmitting coil and the power-receiving coil is large, there is a problem in that desired power cannot be supplied to the power-receiving device.

The present disclosure is conceived in view of the above-described circumstances and an object thereof is to supply desired power to a power-receiving device without causing a voltage to exceed a withstanding voltage of an element of a voltage converter or an inverter circuit in a power-transmitting device even when misalignment between a power-transmitting coil and a power-receiving coil is large.

Solution to Problem

According to a first aspect of the present disclosure, a power-transmitting device including a voltage converter that converts a voltage and an inverter circuit that converts power input from the voltage converter into AC power, generating a magnetic field on the basis of the AC power output from the inverter circuit, and supplying power to a power-receiving device that rectifies power which is received by a receiving-side pad via the magnetic field and smoothes the rectified power using a filter circuit, the power-transmitting device includes: a communication unit that communicates with the power-receiving device; and a control unit, wherein the communication unit receives, from the power-receiving device, information on the power received by the power-receiving device and the control unit causes the communication unit to transmit an instruction for changing at least one of inductance and capacitance of an element which is disposed from the receiving-side pad to the filter circuit in the power-receiving device so as to satisfy a condition that the received power approaches a target value when a voltage across an element of the voltage converter or the inverter circuit has reached an upper limit of a withstanding voltage of the element and it is determined that the received power of the power-receiving device has not reached a target value on the basis of the information.

A second aspect of the present disclosure provides the power-transmitting device according to the first aspect, wherein the condition includes a condition that power efficiency to the power-receiving device approaches a target value.

A third aspect of the present disclosure provides the power-transmitting device according to the first or second aspect, wherein the condition includes a condition that attenuation in the filter circuit at a frequency, which corresponds to a driving frequency of the inverter circuit, approaches a target value.

A fourth aspect of the present disclosure provides the power-transmitting device according to any one of the first to third aspects, wherein the element which is disposed from the receiving-side pad to the filter circuit is a reactor in the filter circuit.

A fifth aspect of the present disclosure provides the power-transmitting device according to the fourth aspect, wherein the reactor is a variable reactor.

A sixth aspect of the present disclosure provides the power-transmitting device according to the fourth aspect, wherein the reactor is configured to be switchable by a switching element.

A seventh aspect of the present disclosure provides the power-transmitting device according to any one of the first to sixth aspects, wherein the control unit stops the supply of power and causes the communication unit to transmit the instruction so as to satisfy the condition when the voltage across the element of the voltage converter or the inverter circuit has reached the upper limit of the withstanding voltage and it is determined that the received power of the power-receiving device has not reached the target value on the basis of the information, and restarts the supply of power after at least one of inductance and capacitance of the element which is disposed from the receiving-side pad to the filter circuit is changed.

A wireless power-supplying system according to the present disclosure includes the power-transmitting device according to any one of the first to seventh aspects and a power-receiving device that receives power which is supplied from the power-transmitting device in a wireless manner.

Effects

According to the present disclosure, when a voltage across an element of the voltage converter or the inverter circuit has reached an upper limit of a withstanding voltage of the element and it is determined that the received power of the power-receiving device has not reached a target value, an instruction for changing at least one of inductance and capacitance of an element which is disposed from the receiving-side pad to the filter circuit in the power-receiving device is transmitted from the power-transmitting device to the power-receiving device so as to satisfy the condition that the received power approaches the target value. Accordingly, even when misalignment between a power-transmitting coil and a power-receiving coil is large, it is possible to supply desired power to the power-receiving device without causing the voltage to exceed the withstanding voltage of an element of the voltage converter or the inverter circuit in the power-transmitting device.

DESCRIPTION OF EMBODIMENTS

Hereinafter, an embodiment of the present disclosure will be described with reference to the accompanying drawings.

Figure 1:
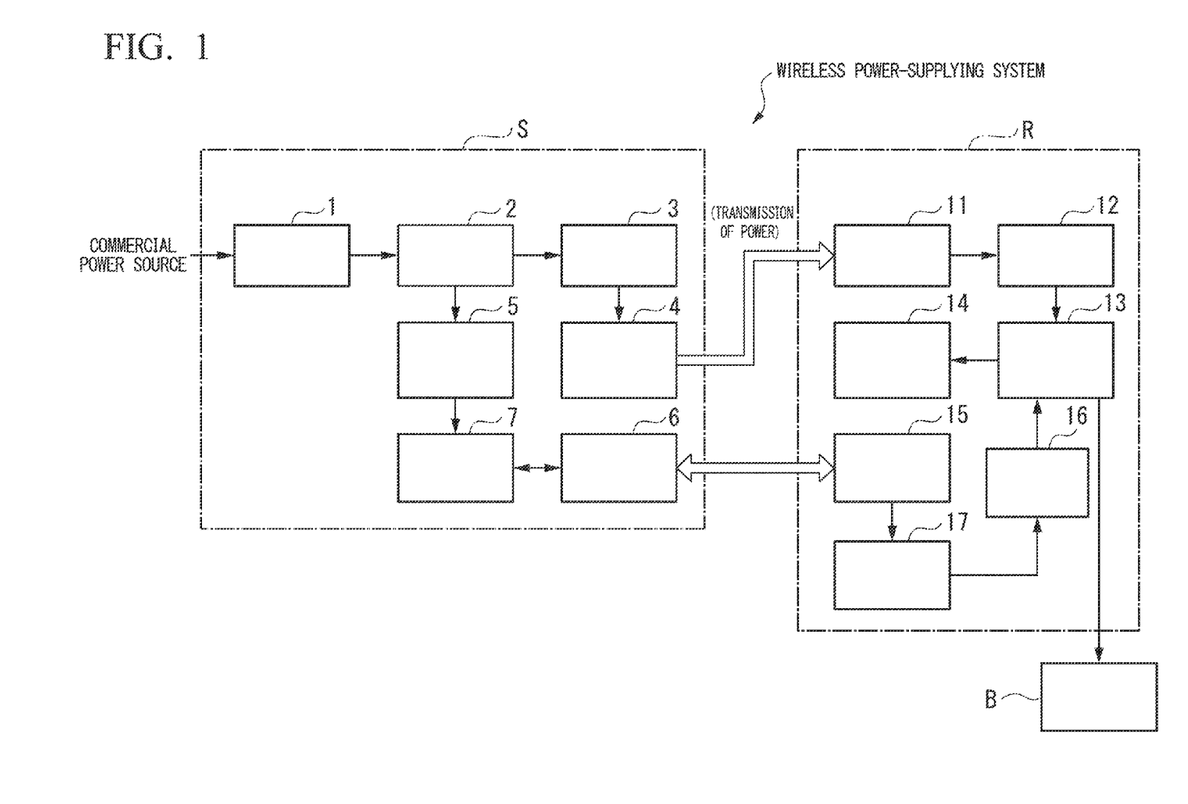
FIG. 1 is a functional block diagram of a wireless power-supplying system according to an embodiment of the present disclosure.
Figure 2:
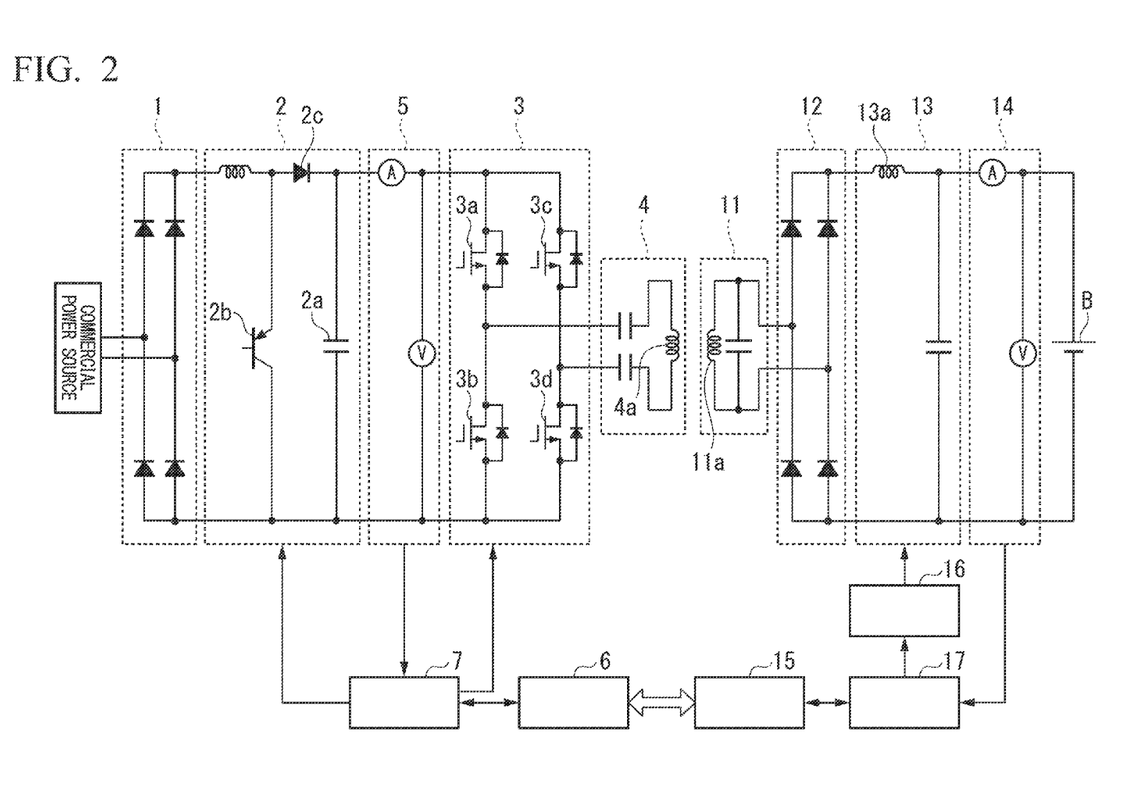
FIG. 2 is a circuit diagram of the wireless power-supplying system according to the embodiment of the present disclosure.

A wireless power-supplying system according to this embodiment includes a power-transmitting device S and a power-receiving device R as shown in FIGS. 1 and 2. As shown in the drawings, the power-transmitting device S includes a transmitting-side rectifier circuit 1, a chopper circuit 2, an inverter circuit 3, a transmitting-side pad 4, a transmitting-side current/voltage sensor 5, a transmitting-side communication unit 6, and a transmitting-side operation control unit 7. The transmitting-side operation control unit 7 constitutes a transmitting-side control unit in this embodiment.

On the other hand, the power-receiving device R includes a receiving-side pad 11, a receiving-side rectifier circuit 12, a filter circuit 13, a receiving-side current/voltage sensor 14, a receiving-side communication unit 15, a reactor switching unit 16, and a receiving-side operation control unit 17. The receiving-side current/voltage sensor 14, the reactor switching unit 16, and the receiving-side operation control unit 17 constitutes a receiving-side control unit in this embodiment.

The power-transmitting device S is a device that is fixed to a power-supplying facility installed on the ground and supplies AC power to a power-receiving device R disposed in a movable body in a wireless manner. The power-supplying facility is a facility which is provided with one or more stop spaces for a movable body and which includes the power-transmitting device S in a number corresponding to the number of stop spaces. On the other hand, the power-receiving device R is a device which is mounted on a movable body and which charges a battery B by converting AC power supplied from the power-transmitting device S into DC power. The movable body is, for example, a vehicle which requires reception of power (electric power) from the outside, such as an electric vehicle or a hybrid vehicle.

In the power-transmitting device S, the transmitting-side rectifier circuit 1 is, for example, a diode bridge and serves to full-wave rectify commercial power (for example, single-phase 100 volts, 50 Hz) supplied from an external commercial power source and to output the rectified power to the chopper circuit 2. The power (full-wave rectified power) supplied from the transmitting-side rectifier circuit 1 to the chopper circuit 2 is a unipolar (for example, of positive polarity) pulsating wave in which sinusoidal commercial power is folded back at a zero-crossing point.

The chopper circuit 2 adjusts its output voltage and outputs the adjusted output voltage to the inverter circuit 3 by allowing the transmitting-side operation control unit 7 to control its switching operation. Specifically, the chopper circuit 2 is a step-up chopper circuit or a step-up/down chopper circuit and serves to step up/down a voltage input from the transmitting-side rectifier circuit 1 and to output the stepped-up/down voltage. The output of the chopper circuit 2 is DC power in which the full-wave rectified power as a pulsating wave is sufficiently smoothed by the function of a capacitor 2a disposed at an output terminal of the chopper circuit 2. The capacitor 2a may be disposed at an input terminal of the inverter circuit 3 as a part of the inverter circuit 3, rather than a part of the chopper circuit.

The chopper circuit 2 also serves as a power factor correction (PFC) circuit by allowing the transmitting-side operation control unit 7 to control its switching operation. That is, the chopper circuit 2 extends a current-flowing period of a current of the full-wave rectified power to correct a power factor by switching the full-wave rectified power at a frequency sufficiently higher than the frequency of the full-wave rectified power with respect to the zero-crossing point of the full-wave rectified power. Since it is generally known that the chopper circuit 2 serves as the power factor correction circuit, details of the principle of power factor correction of the chopper circuit 2 will not be described herein.

The inverter circuit 3 is a power converter circuit that converts DC power supplied from the transmitting-side rectifier circuit 1 into AC power of a predetermined frequency (driving frequency) on the basis of a switching signal (inverter driving signal) input from the transmitting-side operation control unit 7. That is, the inverter circuit 3 converts DC power into AC power through switching at the driving frequency by driving a plurality of switching elements (such as IGBTs and power metal-oxide-semiconductor field-effect transistors (MOSFETs)) in response to the inverter driving signal. The inverter circuit 3 outputs the AC power of the driving frequency to the transmitting-side pad 4.

The transmitting-side pad 4 is, for example, a resonance circuit including a power-transmitting coil 4a and a power-transmitting capacitor, and generates a magnetic field on the basis of the AC power supplied from the inverter circuit 3. Of the power-transmitting coil 4a and the power-transmitting capacitor, the power-transmitting coil 4a is disposed at a position facing a predetermined position (position at which a power-receiving coil 11a is disposed) of a movable body which stops in the stop space.

The transmitting-side current/voltage sensor 5 detects a current and a voltage of the DC power supplied from the chopper circuit 2 to the inverter circuit 3, and outputs a detection signal indicating the detected current and the detected voltage to the transmitting-side operation control unit 7. As the current sensor, for example, a sensor that measures a magnetic field generated around a wire through which a current flows using the Hall effect or a sensor that measures a voltage drop generated in a resistor which is inserted into a wire through which a current passes can be used. As the voltage sensor, for example, a sensor that divides a voltage using a resistor and converts the voltage into a digital value using an analog-to-digital (AD) converter can be used.

The transmitting-side communication unit 6 performs short-range wireless communication with the receiving-side communication unit 15 of the power-receiving device R. The communication system between the transmitting-side communication unit 6 and the receiving-side communication unit 15 is short-range wireless communication such as ZigBee (registered trademark) or Bluetooth (registered trademark) or short-range optical communication using an optical signal. The transmitting-side communication unit 6 includes an antenna in a communication system using radio waves, and includes a light-emitting element and a light-receiving element for communication in a communication system using an optical signal.

The transmitting-side operation control unit 7 includes a central processing unit (CPU), a read only memory (ROM), a random access memory (RAM), and an interface circuit that transmits and receives various signals to and from units which are mutually electrically interconnected. The transmitting-side operation control unit 7 controls the entire operations of the power-transmitting device S by performing various operation processes and communicating with the units on the basis of various operation control programs stored in the ROM.

For example, the transmitting-side operation control unit 7 changes a step-up/down ratio of the chopper circuit 2 on the basis of information (received power information), which is received by the transmitting-side communication unit 6 from the power-receiving device R, on the power, the voltage, the current, and the like which are received by the power-receiving device R. When the voltage of the power (a voltage across an output terminal of the chopper circuit 2) output from the chopper circuit 2 has reached the upper limit of a withstanding voltage of the capacitor 2a of the chopper circuit 2 and the power received by the power-receiving device R has not reached a target value, the transmitting-side operation control unit 7 causes the transmitting-side communication unit 6 to transmit an instruction (reactor changing instruction) for changing the reactor 13a in the filter circuit 13 to be described below of the power-receiving device R so as to cause the power received by the power-receiving device R to approach a target value. The element in which the voltage across the output terminal of the chopper circuit 2 has to be cared about in view of the withstanding voltage thereof is not limited to the capacitor 2a of the chopper circuit 2, but may be an arbitrary element of the chopper circuit 2 or the inverter circuit 3. For example, a voltage applied to switching elements 3a to 3d of the inverter circuit 3 or a switching element 2b of the chopper circuit 2 is as follows. In the inverter circuit 3, a combination of the switching elements 3a and 3d and a combination of the switching elements 3b and 3c are alternately turned on and off. Accordingly, when the combination of the switching elements 3a and 3d is turned on (that is, electrically connected), the voltage applied to the switching elements 3b and 3c is equal to a value obtained by subtracting voltage drops in the switching elements 3a and 3d from the voltage across the output terminal of the chopper circuit 2. The voltage across the switching elements 3a and 3d when the combination of the switching elements 3b and 3c is turned on can be similarly calculated from the voltage across the output terminal of the chopper circuit 2. A voltage obtained by adding a voltage drop in a diode 2c to the voltage across the output terminal of the chopper circuit 2 is applied to the switching element 2b of the chopper circuit 2. Accordingly, the transmitting-side operation control unit 7 can specify whether or not the voltages across the switching elements 3a to 3d and the switching element 2b reach the upper limits of the withstanding voltages of the elements on the basis of the voltage across the output terminal of the chopper circuit 2 by grasping the values of the voltage drops of the switching elements 3a to 3d and the diode 2c. When the values of the voltage drops of the switching elements 3a to 3d and the diode 2c are much smaller than the voltage across the output terminal of the chopper circuit 2, the transmitting-side operation control unit 7 may ignore the values of the voltage drops and may consider that the voltage across the output terminal of the chopper circuit 2 is applied to the switching elements 3a to 3d and the switching element 2b. Details of the operation of the transmitting-side operation control unit 7 will be described below.

On the other hand, the receiving-side pad 11 in the power-receiving device R is, for example, a resonance circuit including a power-receiving coil 11a and a power-receiving capacitor and receives power via the magnetic field generated by the transmitting-side pad 4. The power-receiving coil 11a is disposed in the bottom, on the side, on the top, or the like of a movable body, and closely faces the power-transmitting coil 4a constituting the power-transmitting device S when the movable body stops in a stop space.

The power-receiving coil 11a of the receiving-side pad 11 closely faces the power-transmitting coil 4a constituting the transmitting-side pad 4 and is magnetically coupled thereto. That is, the receiving-side pad 11 receives AC power which is supplied to the power-transmitting coil 4a by the inverter circuit 3 and is based on the coupling coefficient between the power-transmitting coil 4a and the power-receiving coil 11a in a wireless manner and outputs the received AC power to the receiving-side rectifier circuit 12. That is, the wireless power-supplying system is a wireless power-supplying system based on a magnetic-field resonance system. The above-mentioned embodiment is a wireless power-supplying system based on a magnetic-field resonance system, but the present disclosure can be applied to an electromagnetic induction system.

The receiving-side rectifier circuit 12 is constituted, for example, by a diode bridge and full-wave rectifies and outputs AC power (received power) supplied from the receiving-side pad 11 to the filter circuit 13. The power supplied from the receiving-side rectifier circuit 12 to the filter circuit 13 is full-wave rectified power which is full-wave rectified by the diode bridge.

The filter circuit 13 includes, for example, a reactor 13a and a capacitor, removes noise from the full-wave rectified power supplied from the receiving-side operation control unit 17, and smoothes and outputs the full-wave rectified power to the battery B. The reactor 13a is, for example, a variable reactor.

The receiving-side current/voltage sensor 14 detects a current and a voltage of the DC power supplied from the filter circuit 13 to the battery B, and outputs a detection signal indicating the detected current and the detected voltage to the transmitting-side operation control unit 17. As the current sensor, for example, a sensor that measures a magnetic field generated around a wire through which a current flows using the Hall effect or a sensor that measures a voltage drop generated in a resistor which is inserted into a wire through which a current passes can be used. As the voltage sensor, for example, a sensor that divides a voltage using a resistor and converts the voltage into a digital value using an analog-to-digital (AD) converter can be used.

The receiving-side communication unit 15 performs short-range wireless communication with the transmitting-side communication unit 6 of the power-transmitting device S. The communication system between the transmitting-side communication unit 6 and the receiving-side communication unit 15 is short-range wireless communication such as ZigBee (registered trademark) or Bluetooth (registered trademark) or short-range optical communication using an optical signal.

The receiving-side communication unit 15 includes an antenna in a communication system using radio waves, and includes a light-emitting element and a light-receiving element for communication in a communication system using an optical signal.

The reactor switching unit 16 is a drive device such as a motor that drives the reactor 13a which is a variable reactor in order to change inductance of the reactor 13a and operates on the basis of a control command input from the receiving-side operation control unit 17.

The receiving-side operation control unit 17 includes a central processing unit (CPU), a read only memory (ROM), a random access memory (RAM), and an interface circuit that transmits and receives various signals to and from units which are mutually electrically interconnected. The transmitting-side operation control unit 17 controls the entire operations of the power-receiving device R by performing various operation processes and communicating with the units on the basis of various operation control programs stored in the ROM.

For example, when the receiving-side communication unit 15 receives the above-mentioned reactor changing instruction from the power-transmitting device S, the receiving-side operation control unit 17 controls the reactor switching unit 16 such that power received by the power-receiving device R approaches a target value, and causes the reactor switching unit 16 to change the inductance of the reactor 13a in the filter circuit 13. Details of the operation of the receiving-side operation control unit 17 will be described below.

The battery B is a secondary battery such as a lithium ion battery and is charged with DC power supplied from the receiving-side rectifier circuit 12. The battery B is connected to an inverter (running inverter) that drives a running motor of a movable body and/or a control device that controls running of the movable body and supplies driving power to the running inverter or the control device.

The operation of the wireless power-supplying system having the above-mentioned configuration will be described below in detail with reference to FIGS. 3 to 6.

In the wireless power-supplying system, when a movable body enters a stop space, the power-transmitting device S starts supplying power to the power-receiving device R of the movable body. For example, the transmitting-side communication unit 6 of the power-transmitting device S continuously issues a communication request signal at a predetermined period, and the receiving-side communication unit 15 of the power-receiving device R can receive the communication request signal and thus transmits a response signal with respect to the communication request signal to the transmitting-side communication unit 6 when the movable body enters the stop space. When the response signal is received, the transmitting-side communication unit 6 notifies the transmitting-side operation control unit 7 of the receiving of the response signal. As a result, the transmitting-side operation control unit 7 determines (recognizes) that the movable body enters a power-suppliable area. The transmitting-side operation control unit 7 controls the chopper circuit 2 and the inverter circuit 3 so as to supply power to the power-receiving device R.

On the other hand, in the power-receiving device R, when the supply of power from the power-transmitting device S is started, the receiving-side operation control unit 17 calculates received power on the basis of the detection signal input from the receiving-side current/voltage sensor 14 and causes the receiving-side communication unit 15 to transmit the calculated received power as received power information. As a method of calculating the received power, for example, a method of multiplying a receiving-side current value and a receiving-side voltage value and calculating a time average thereof can be used.

On the other hand, when the transmitting-side communication unit 6 receives the received power information from the power-receiving device R, the transmitting-side operation control unit 7 causes the chopper circuit 2 to change the step-up/down ratio such that the received power of the power-receiving device R indicated by the received power information approaches a target value. The transmitting-side operation control unit 7 determines an output voltage (that is, a voltage across the capacitor 2a) from the chopper circuit 2 on the basis of the detection signal input from the transmitting-side current/voltage sensor 5, temporarily stops the supply of power when the output voltage has reached the upper limit of the withstanding voltage of the capacitor 2a of the chopper circuit 2 and the power received by the power-receiving device R has not reached a target value, and causes the transmitting-side communication unit 6 to transmit a reactor changing instruction for changing the reactor 13a in the filter circuit 13 of the power-receiving device R such that the power received by the power-receiving device R approaches the target value (step S1 in FIG. 3).

Figure 3:
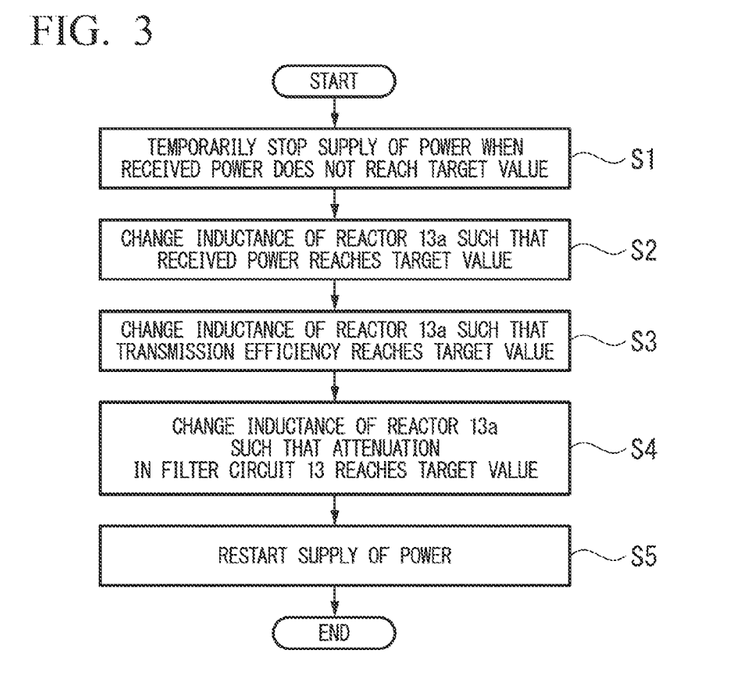
FIG. 3 is a flowchart showing an operation of the wireless power-supplying system according to the embodiment of the present disclosure.

When the receiving-side communication unit 15 receives the reactor changing instruction from the power-transmitting device S, the receiving-side operation control unit 17 controls the reactor switching unit 16 such that the power received by the power-receiving device R approaches the target value, and causes the reactor switching unit 16 to change the inductance of the reactor 13*a* in the filter circuit 13 (step S2 in FIG. 3).

Figure 4:
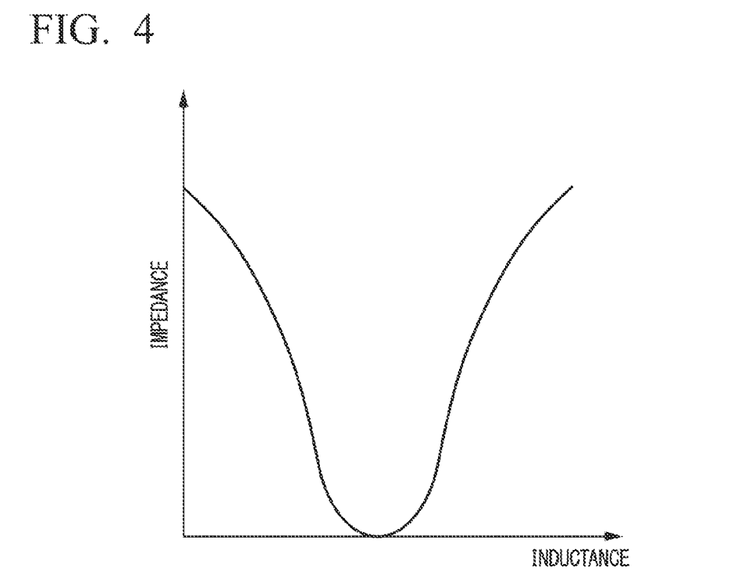
FIG. 4 is a graph showing a relationship between inductance and impedance of a reactor 13a in the wireless power-supplying system according to the embodiment of the present disclosure.

In the wireless power-supplying system, impedance is changed by changing the inductance of the reactor 13*a*. Here, the impedance is impedance when the power-receiving side is viewed from the output terminal of the chopper circuit 2. In this embodiment, the inverter circuit 3, the transmitting-side pad 4, the receiving-side pad 11, and the receiving-side rectifier circuit 12 do not change the impedance because circuit constants thereof are fixed. On the other hand, the coupling coefficient between the transmitting-side pad 4 and the receiving-side pad 11 is changed depending on the misalignment and a state of charge (SOC) of the battery B or desired power to be supplied to the battery B is changed depending on charging conditions. With this change, the impedance when the power-receiving side is viewed from the output terminal of the chopper circuit 2 is changed. With an increase of the impedance, the desired power may not be supplied to the battery B even when the output voltage of the chopper circuit 2 has reached the upper limit of the withstanding voltage of the capacitor 2*a*. Therefore, in this embodiment, an increase of the output current of the chopper circuit 2 is realized by decreasing the impedance. By changing the inductance of the reactor 13*a*, the impedance is changed, for example, in a V shape in accordance with the change of the inductance of the reactor 13*a* as shown in FIG. 4. An approximate impedance value based on the change of the inductance of the reactor 13*a* due to the driving of the reactor switching unit 16 is experimentally acquired beforehand. Then, a data table based on the data experimentally acquired, that is, a received power adjustment table (see FIG. 5) in which approximate impedance (impedance range) for each inductance of the reactor 13*a* (or a degree of driving of the reactor 13*a* by the reactor switching unit 16) is registered, is prepared and is stored in the receiving-side operation control unit 17 in advance.

Figure 5:
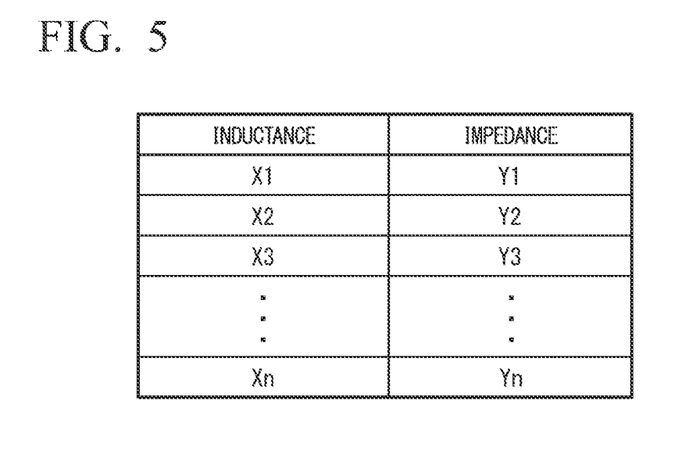
FIG. 5 is a schematic diagram showing a received power adjustment table in the wireless power-supplying system according to the embodiment of the present disclosure.

The receiving-side operation control unit 17 controls the reactor switching unit 16 so as to decrease the impedance such that the power received by the power-receiving device R approaches the target value on the basis of the received power adjustment table, and causes the reactor switching unit 16 to change the inductance of the reactor 13*a* in the filter circuit 13. In the power-receiving device R, the received power increases to the target value with the decrease in impedance.

Subsequently, when the power received by the power-receiving device R increases to the target value, the receiving-side operation control unit 17 controls the reactor switching unit 16 such that power efficiency to the power-receiving device approaches a target value on the premise that the received power has reached the target value, and causes the reactor switching unit 16 to change the inductance of the reactor 13*a* in the filter circuit 13 (step S3 in FIG. 3). The power efficiency refers to a ratio of power at a position in the power-receiving device R to power at a position in the power-transmitting device S, and is a ratio of power supplied to the battery B to power input to the inverter circuit 3 of the power-transmitting device S in this embodiment. However, the present disclosure is not limited to this aspect, and for example, the ratio of power supplied to the battery B to power from a commercial power source supplied to the power-transmitting device S can be used as the power efficiency. In this case, the input terminal of the transmitting-side rectifier circuit 1 is provided with a current/voltage sensor. When the input terminal of the transmitting-side rectifier circuit 1 is provided with a current sensor, a current of the input terminal of the inverter circuit 3 may be estimated from the detected value of the current sensor.

For example, in the power-transmitting device S, the transmitting-side operation control unit 7 calculates supply power on the basis of the current and the voltage indicated by the detection signal input from the transmitting-side current/voltage sensor 5 and causes the transmitting-side communication unit 6 to transmit supply power information indicating the supply power. When the receiving-side communication unit 15 receives the supply power information from the power-transmitting device S, the receiving-side operation control unit 17 calculates the power efficiency on the basis of the supply power indicated by the supply power information and the received power which is calculated on the basis of the current and the voltage indicated by the detection signal input from the receiving-side current/voltage sensor 14, controls the reactor switching unit 16 such that the power efficiency approaches the target value, and causes the reactor switching unit 16 to change the inductance of the reactor 13*a* in the filter circuit 13. At the time of adjustment of the power efficiency, the inductance of the reactor 13*a* is changed, power is supplied, and the power efficiency is checked. When the power efficiency does not reach the target value, the operation of stopping the supply of power and changing the inductance of the reactor 13*a* is repeated.

Subsequently, when the power efficiency to the power-receiving device R has reached the target value, the receiving-side operation control unit 17 controls the reactor switching unit 16 such that attenuation in the filter circuit 13 at a frequency corresponding to the driving frequency (for example, 100 kHz) of the power-transmitting device S approaches a target value on the premise that the received power has reached the target value and the power efficiency to the power-receiving device has reached the target value, and causes the reactor switching unit 16 to change the inductance of the reactor 13*a* in the filter circuit 13 (step S4 in FIG. 3).

That is, in the wireless power-supplying system, by changing the inductance of the reactor 13*a*, the attenuation in the filter circuit 13 at a frequency corresponding to the driving frequency of the inverter circuit 3 of the power-transmitting device S is prevented from being further away from the target value. For example, when the filter circuit 13 shows the frequency characteristic shown in FIG. 6, the attenuation G at a frequency corresponding to the driving frequency (for example, 100 kHz) of the inverter circuit 3 should reach the target value. For example, the attenuation at 100 kHz based on the change in inductance of the reactor 13*a* due to the driving of the reactor 13*a* by the reactor switching unit 16 is experimentally acquired beforehand. A data table based on the data experimentally acquired, that is, an attenuation adjustment table in which the attenuation at 100 kHz for each inductance of the reactor 13*a* (or a degree of driving of the reactor 13*a* by the reactor switching unit 16) is registered, is prepared and is stored in the receiving-side operation control unit 17 in advance.

Figure 6:
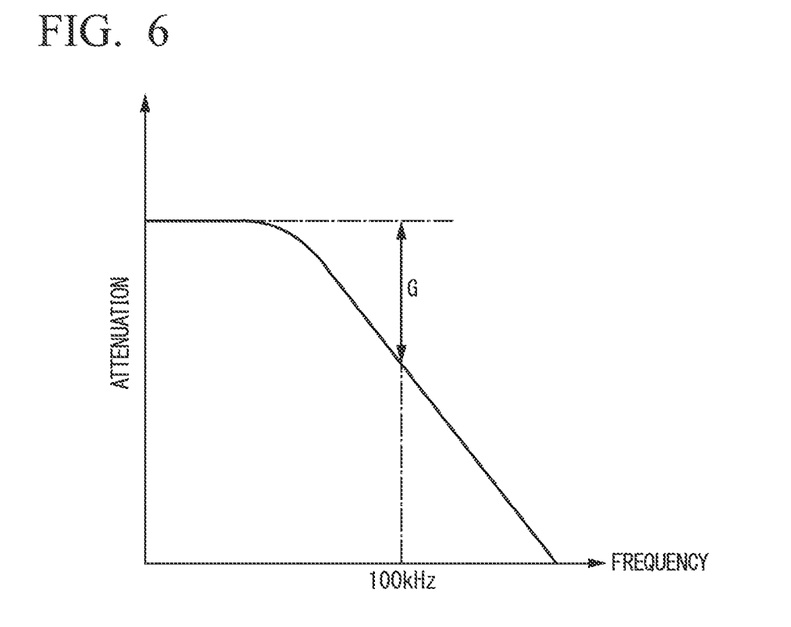
FIG. 6 is a graph showing frequency characteristics of a filter circuit 13 in the wireless power-supplying system according to the embodiment of the present disclosure.

The receiving-side operation control unit 17 controls the reactor switching unit 16 such that the attenuation G in the filter circuit 13 at a frequency corresponding to the driving frequency of the inverter circuit 3 of the power-transmitting device S approaches the target value on the basis of the attenuation adjustment table, and causes the reactor switching unit 16 to change the inductance of the reactor 13*a* in the filter circuit 13. When the attenuation G in the filter circuit 13 at a frequency corresponding to the driving frequency of the inverter circuit 3 of the power-transmitting device S has reached the target value, the receiving-side operation control unit 17 causes the receiving-side communication unit 15 to notify of completion.

When the transmitting-side communication unit 6 receives the received power information from the power-receiving device R, the transmitting-side operation control unit 7 of the power-transmitting device S restarts the supply of power (step S5 in FIG. 3).

According to this embodiment, when the voltage across the capacitor 2a of the chopper circuit 2 has reached the upper limit of the withstanding voltage and the power received by the power-receiving device R has not reached the target value, the instruction for changing the inductance of the reactor 13a in the filter circuit 13 of the power-receiving device R is transmitted from the power-transmitting device S to the power-receiving device R such that the power received by the power-receiving device R approaches the target value. Accordingly, even when the misalignment between the power-transmitting coil 4a and the power-receiving coil 11a is large, it is possible to supply desired power to the power-receiving device R without causing a voltage to exceed the withstanding voltage of the capacitor 2a disposed in the chopper circuit 2 of the power-transmitting device S.

According to this embodiment, when the power received by the power-receiving device R increases to the target value, the inductance of the reactor 13a in the filter circuit 13 is changed such that the power efficiency to the power-receiving device R approaches a target value on the premise that the received power has reached the target value. Accordingly, the power efficiency is not degraded.

According to this embodiment, when the power efficiency to the power-receiving device R has reached the target value, the inductance of the reactor 13a in the filter circuit 13 is changed such that the attenuation G in the filter circuit 13 at a frequency corresponding to the driving frequency (for example, 100 kHz) of the inverter circuit 3 of the power-transmitting device S approaches a target value on the premise that the power efficiency to the power-receiving device has reached the target value. Accordingly, the filtering function which is required for the filter circuit 13 is not degraded.

While an embodiment of the present disclosure has been described above, the present disclosure is not limited to the embodiment and, for example, the following variant examples can be considered.

(1) In the above-mentioned embodiment, the inductance of the reactor 13a in the filter circuit 13 is changed, but the present disclosure is not limited to this configuration. In the present disclosure, at least one of inductance and capacitance of an element which is disposed from the receiving-side pad 11 to the filter circuit 13 in the power-receiving device R may be changed. For example, in the present disclosure, the capacitance of a capacitor of the receiving-side pad 11 or the filter circuit 13 may be changed.

Figure 7A:
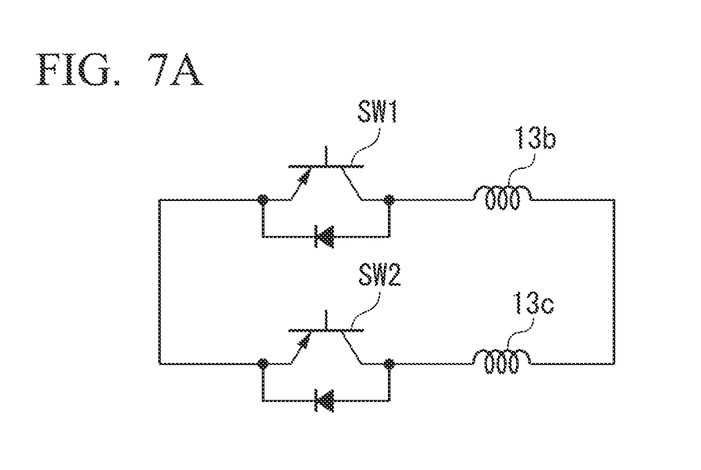
FIG. 7A is a diagram showing a variant example of the wireless power-supplying system according to the embodiment of the present disclosure.
Figure 7B:
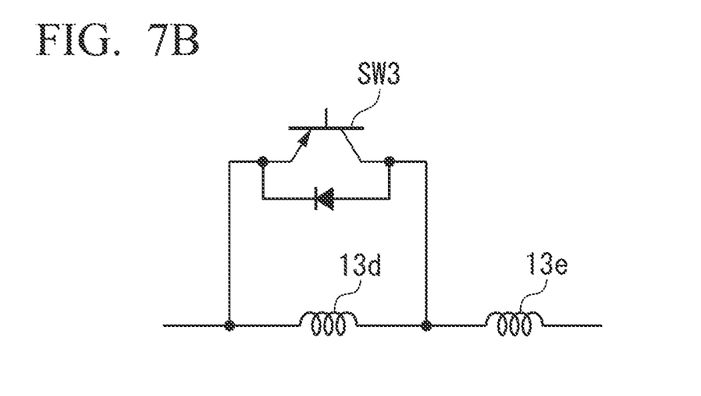
FIG. 7B is a diagram showing a variant example of the wireless power-supplying system according to the embodiment of the present disclosure.

(2) In the above-mentioned embodiment, the reactor 13a is a variable reactor, but configurations which include reactors 13b, 13c, 13d, and 13e and switching elements SW1, SW, and SW3 shown in FIGS. 7A and 7B and in which the inductance is changed by switching the switching elements SW1, SW2, and SW3 to switch the reactors 13b, 13c, 13d, and 13e may be employed instead of the variable reactor. In this case, since the switching of the switching elements SW1, SW2, and SW3 is controlled in accordance with a control command input from the receiving-side operation control unit 17, the reactor switching unit 16 may be omitted. When the capacitance of a capacitor of the receiving-side pad 11 or the filter circuit 13 is changed as described above, capacitors and switching elements are configured like the configurations of the reactors 13b, 13c, 13d, and 13e and the switching elements SW1, SW2, and SW3 shown in FIGS. 7A and 7B and the capacitors may be switched.

(3) In the above-mentioned embodiment, the receiving-side operation control unit 17 controls the reactor switching unit 16 so as to decrease the impedance such that the power received by the power-receiving device R approaches the target value on the basis of the received power adjustment table shown in FIG. 5, but the present disclosure is not limited to this configuration. For example, the receiving-side operation control unit 17 may pre-store a data table for calculating accurate impedance (unambiguous impedance) on the basis of other parameters such as characteristic values of elements constituting the receiving-side pad 11 or the receiving-side rectifier circuit 12 in addition to the inductance of the reactor 13a and may control the reactor switching unit 16 such that the power received by the power-receiving device R approaches the target value on the basis of the data table. As a result, the inductance of the reactor 13a is changed, the impedance decreases to the value registered in the data table, and the power received by the power-receiving device R increases to the target value.

(4) In the above-mentioned embodiment, the transmitting-side current/voltage sensor 5 is disposed between the chopper circuit 2 and the inverter circuit 3 and the current and the voltage of the DC power supplied from the chopper circuit 2 to the inverter circuit 3 are detected, but the present disclosure is not limited to this configuration. For example, the transmitting-side current/voltage sensor 5 may be disposed between the transmitting-side rectifier circuit 1 and the chopper circuit 2 and the current and the voltage of the power supplied from the transmitting-side rectifier circuit 1 to the chopper circuit 2 may be detected. In this case, the transmitting-side operation control unit 7 estimates the output voltage of the chopper circuit 2 on the basis of the voltage of the power supplied from the transmitting-side rectifier circuit 1 to the chopper circuit 2 and the step-up/down ratio of the chopper circuit 2.

(5) In the above-mentioned embodiment, when the power received by the power-receiving device R has not reached the target value, the supply of power is temporarily stopped and then the transmitting-side communication unit 6 is made to transmit the changing instruction, but the transmitting-side communication unit 6 may be made to transmit the changing instruction without stopping the supply of power. That is, the inductance of the reactor 13a in the filter circuit 13 may be changed without stopping the supply of power.

Figure 8:
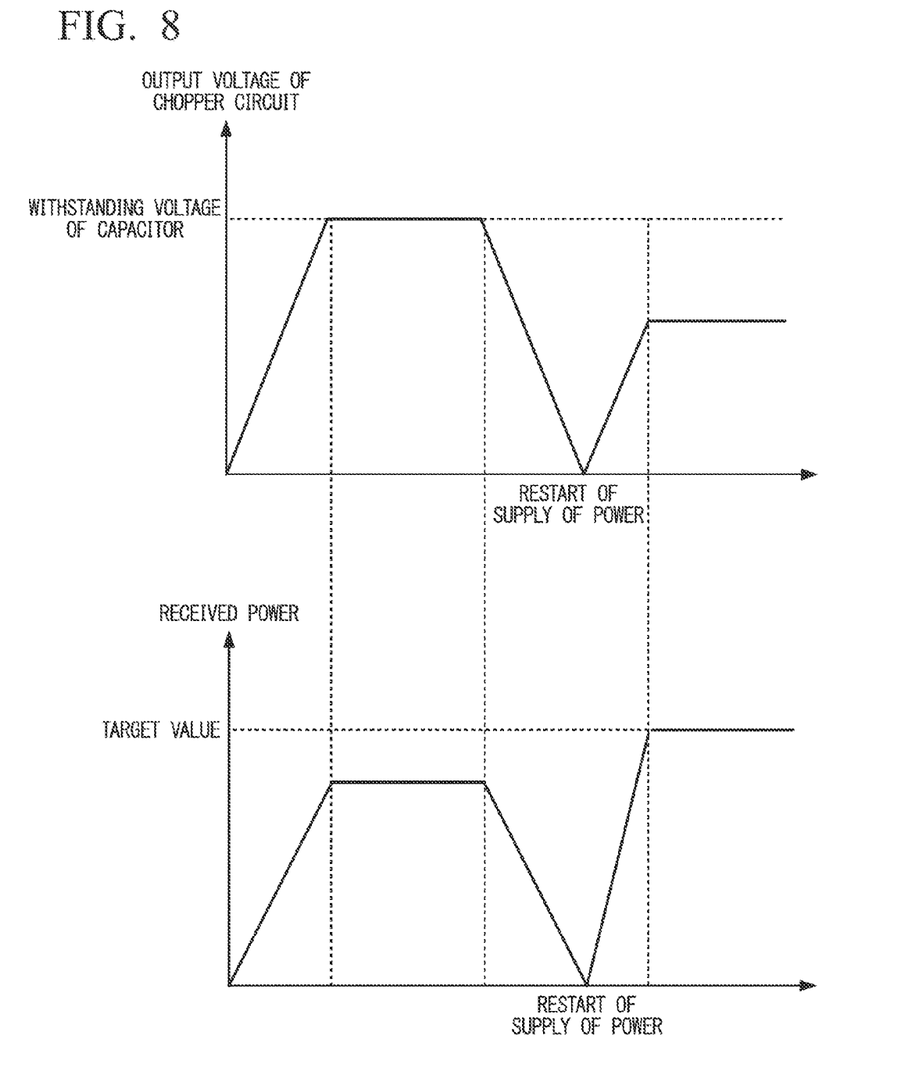
FIG. 8 is a diagram showing an example of an operation of the wireless power-supplying system according to the embodiment of the present disclosure.

When the supply of power is temporarily stopped, the output voltage of the chopper circuit 2 and the received power of the power-receiving device R vary, for example, as shown in FIG. 8. That is, when the voltage across the capacitor 2a of the chopper circuit 2 has reached the upper limit of the withstanding voltage and the received power of the power-receiving device R has not reached the target value, the transmitting-side operation control unit 7 stops the supply of power, causes the transmitting-side communication unit 6 to transmit the changing instruction so as to satisfy the above-mentioned condition (that the received power approaches a target value, or the power efficiency approaches a target value, or the attenuation in the filter circuit approaches a target value), and restarts the supply of power after the inductance of the reactor 13a of the power-receiving device R is changed. The voltage across the capacitor 2a does not reach the upper limit even when the received power has reached the target value after the supply of power is restarted. This is because the impedance decreases.

(6) In the above-mentioned embodiment, the chopper circuit 2 is used as a voltage converter, but a transformer which is an insulated voltage converter may be used instead of the chopper circuit 2 which is a non-insulated voltage converter. In the above-mentioned embodiment, a full bridge is used as the transmitting-side rectifier circuit 1 or the receiving-side rectifier circuit 12, but a half bridge may be used instead of the full bridge. In the above-mentioned embodiment, a voltage converter may be provided at a subsequent stage of the filter circuit 13, depending on a load.

The battery B is provided as a load, but a DC load (an electric storage device such as a capacitor or a resistive load such as a heat-emitting body) or an AC load (an inductance load such as a motor) other than the battery B may be provided. When an AC load is provided, a subsequent stage of the filter circuit 13 needs to be provided with an inverter circuit or the like in order to generate AC power. The commercial power source which is an AC power source is used, but a DC power source may be used. When a DC power source is provided, the transmitting-side rectifier circuit 1 needs to be removed.

(7) In the above-mentioned embodiment, for example, the technical concept of the expression such as the voltage "reaches" the upper limit of the withstanding voltage or the power "reaches" the target value does not have a strict meaning, but includes a meaning including a reference value or a meaning not including the reference value depending on the specifications of the power-transmitting device S or the power-receiving device R. For example, the expression, the voltage "reaches" the upper limit of the withstanding voltage, may include a meaning that the voltage has exceeded the upper limit as well as that the voltage has reached the upper limit.

(8) In the above-mentioned embodiment, it has been described above that the voltages across the switching elements 3a to 3d and the switching element 2b are calculated on the basis of the voltage across the output terminal of the chopper circuit 2, but the present disclosure is not limited to this aspect. For example, each of the switching elements 3a to 3d and the switching element 2b may be provided with a voltage sensor in parallel thereto and the voltages across the switching elements 3a to 3d and the switching element 2b may be directly measured.

INDUSTRIAL APPLICABILITY

According to the present disclosure, it is possible to supply desired power to a power-receiving device without causing a voltage to exceed a withstanding voltage of an element of a voltage converter or an inverter circuit in a power-transmitting device even when misalignment between a power-transmitting coil and a power-receiving coil is large.

What is claimed is:

1. A power-transmitting device including a voltage converter that converts a voltage and an inverter circuit that converts power input from the voltage converter into AC power, generating a magnetic field on the basis of the AC power output from the inverter circuit, and supplying power to a power-receiving device that rectifies power which is received by a receiving-side pad via the magnetic field and smooths the rectified power using a filter circuit, the power-transmitting device comprising:
a communication unit that communicates with the power-receiving device; and
a control unit,
wherein the communication unit receives, from the power-receiving device, information on the power received by the power-receiving device and
wherein the control unit stops the supply of power and causes the communication unit to transmit an instruction for changing at least one of an inductance and a capacitance of an element which is disposed from the receiving-side pad to the filter circuit in the power-receiving device so as to satisfy a condition that the received power approaches a target value when a voltage across an element of the voltage converter or the inverter circuit has reached an upper limit of a withstanding voltage of the element and it is determined that the received power of the power-receiving device has not reached a target value on the basis of the information, and
restarts the supply of power after at least one of the inductance and the capacitance of the element, which is disposed from the receiving-side pad to the filter circuit, is changed.

2. The power-transmitting device according to claim 1, wherein the condition includes a condition that power efficiency to the power-receiving device approaches a target value.

3. The power-transmitting device according to claim 1, wherein the condition includes a condition that attenuation in the filter circuit at a frequency, which corresponds to a driving frequency of the inverter circuit, approaches a target value.

4. The power-transmitting device according to claim 2, wherein the condition includes a condition that attenuation in the filter circuit at a frequency, which corresponds to a driving frequency of the inverter circuit, approaches a target value.

5. The power-transmitting device according to claim 1, wherein the element which is disposed from the receiving-side pad to the filter circuit is a reactor in the filter circuit.

6. The power-transmitting device according to claim 2, wherein the element which is disposed from the receiving-side pad to the filter circuit is a reactor in the filter circuit.

7. The power-transmitting device according to claim 3, wherein the element which is disposed from the receiving-side pad to the filter circuit is a reactor in the filter circuit.

8. The power-transmitting device according to claim 4, wherein the element which is disposed from the receiving-side pad to the filter circuit is a reactor in the filter circuit.

9. The power-transmitting device according to claim 5, wherein the reactor is a variable reactor.

10. The power-transmitting device according to claim 5, wherein the reactor is configured to be switchable by a switching element.

11. A wireless power-supplying system comprising:
the power-transmitting device according to claim 1; and
a power-receiving device that receives power supplied from the power-transmitting device in a wireless manner.

* * * * *